United States Patent [19]
Kometani

[11] Patent Number: 5,670,448
[45] Date of Patent: Sep. 23, 1997

[54] RECORDING SHEET FOR MAKING TRANSPARENCIES AND METHOD OF MAKING THE SAME

[75] Inventor: Shinji Kometani, Tokyo, Japan

[73] Assignee: Dai Nippon Printing Co., Ltd., Japan

[21] Appl. No.: 490,630

[22] Filed: Jun. 15, 1995

[30] Foreign Application Priority Data

Jun. 17, 1994 [JP] Japan .................. 6-159540

[51] Int. Cl.$^6$ .................. B41M 5/035; B41M 5/38
[52] U.S. Cl. .................. 503/227; 156/277; 427/152; 428/195; 428/913; 428/914
[58] Field of Search .................. 8/471; 156/239, 156/240, 277, 235, 237; 427/146, 152; 428/195, 913, 914; 503/227

[56] References Cited

U.S. PATENT DOCUMENTS

| 5,001,106 | 3/1991 | Egashira et al. .................. 503/227 |
| 5,378,675 | 1/1995 | Takeyama et al. .................. 503/227 |

FOREIGN PATENT DOCUMENTS

| 59-98897 | 6/1984 | Japan .................. 503/227 |
| 60-143448 | 9/1985 | Japan .................. 503/227 |
| 60-244590 | 12/1985 | Japan .................. 503/227 |
| 61-84636 | 4/1986 | Japan .................. 503/227 |
| 61-154998 | 7/1986 | Japan .................. 503/227 |
| 62-207691 | 9/1987 | Japan .................. 503/227 |
| 63-107587 | 5/1988 | Japan .................. 503/227 |
| 63-145083 | 6/1988 | Japan .................. 503/227 |
| 63-231986 | 9/1988 | Japan .................. 503/227 |
| 64-45688 | 2/1989 | Japan .................. 503/227 |
| 64-53889 | 3/1989 | Japan .................. 503/227 |
| 1-127372 | 5/1989 | Japan .................. 503/227 |
| 1-235694 | 9/1989 | Japan .................. 503/227 |
| 2-88769 | 3/1990 | Japan .................. 428/690 |
| 2-217283 | 8/1990 | Japan .................. 428/195 |

*Primary Examiner*—Bruce H. Hess
*Attorney, Agent, or Firm*—Parkhurst, Wendel & Burr, L.L.P.

[57] ABSTRACT

A low cost transparency-making recording sheet with stabilized productivity and quality has a support sheet releasably provided on an unrecording surface of a transparent substrate, and is characterized in that a thermoplastic resin layer is interleaved between the transparent substrate and the support sheet by an extrusion coating technique.

13 Claims, 2 Drawing Sheets

RECORDING SHEET FOR MAKING TRANSPARENCIES AND METHOD OF MAKING THE SAME

BACKGROUND TECHNIQUE

The present invention relates to a recording sheet for making transparencies used on projector units such as an overhead projector (hereinafter OHP), and a method of making the same.

As is well known in the art, OHP sheets are designed as recorded sheets for projecting information recorded by various printers onto a screen, and are widely used in conferences and lecture meetings, and for the purpose of education and other like activities.

Transparent sheets such as plastic sheets are used for such OHP sheets, but a problem with them is that the recorded information is hard to see by the naked eye, or their surfaces are susceptible to damage. Depending on the type of printer, it is often required to provide a detection mark on OHP sheets. A problem with using such marks in combination with a projector, however, is that said marks manifests themselves in the form of black images, and so affronts the eye.

The above problem is solved by laminating an opaque support sheet on the unrecorded surface of the transparent sheet in a releasable manner. This OHP sheet having such a support sheet enables the recorded information to be easily viewed so that it can be easily handled, and has an additional merit that even when fed through a printer, the transparent sheet is unsusceptible To damage. Since there is no need for providing a detection mark on the OHP sheet or a detection mark can be formed on the support sheet, it is unlikely that the mark will appear on the OHP sheet during projection, if the support sheet is peeled off.

In the case of the OHP sheet having such a support sheet, it is proposed to form feed holes on both sides of a laminate of the transparent sheet and protective paper and engage them with feed pins for feeding paper, as disclosed in JP-A 59-98897.

It is also proposed to provide an adhesive or self-adhesive layer on the whole or local surfaces of transparent and support sheets so that both can be releasably laminated together, as disclosed in JP-A 61-154998, 62-207691, 63-107587, and 1-127372.

However, the conventional arrangement wherein the transparent and support sheets are held by the feed holes have problems in connection with paper feeding/ejecting, wrinkling, etc., due to insufficient close contact of the transparent sheet with the support sheet.

A problem with using adhesives or the like is that since difficulty is involved in coating, there is often a variation in coating thickness and hence in peel strength. Another problem is that the laminate is likely to wrinkle up or take up air, and so looks poor or has trouble in running stability. Further problems include considerable expense incurred due to poor processability at high speed, and to adverse influence on surrounding due to the drying of solvent an influence on surroundings.

Therefore, an object of the present invention is to provide a transparency-making recording sheet with stabilized productivity and quality yet at low cost, and thereby to eliminate the problems associated with the prior art.

According to the present invention, the above problems are eliminated by the provision of a transparency-making recording sheet having a support sheet releasably provided on an unrecording surface of a transparent substrate, wherein a thermoplastic resin layer is interleaved between the transparent substrate and the support sheet by an extrusion coating technique.

In the transparency-making recording sheet of the present invention, the thermoplastic resin layer is interleaved between the transparent substrate and the support sheet by an extrusion coating technique. Since this thermo-plastic resin layer provided by the extrusion coating technique can be smoothly formed on the transparent substrate or support sheet, it is unlikely that there may be a coating thickness variation, or the laminate may wrinkle up or take up air upon formation. As a result, it is possible to form a transparency-making recording sheet improved in terms of appearance and running stability. Moreover, the thermo-plastic resin layer, when it is formed of polyolefin resin, can be processed at high speed, and has no adverse influence on surroundings because no solvent is used for the formation of the resin layer.

BRIEF DESCRIPTION OF THE DRAWINGS

By way of example but not by way of limitation, the present invention will now be explained with reference to the accompanying drawings, in which.

BEST MODE FOR CARRYING OUT THE INVENTION

The recording sheet for making transparencies according to the present invention comprises a transparent base or substrate and a support sheet, between which a thermoplastic resin layer is provided by an extrusion coating technique.

The transparency-making recording sheet of the present invention will now be explained with reference to the accompanying drawings.

Figure 1:
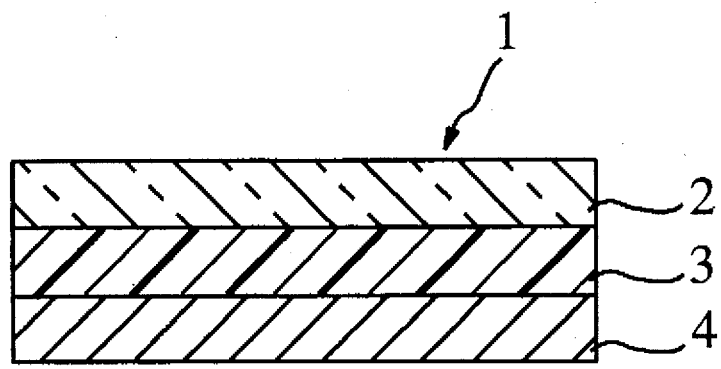
FIG. 1 is a sectional view of one embodiment of the transparency-making recording sheet according to the present invention.
Figure 2:
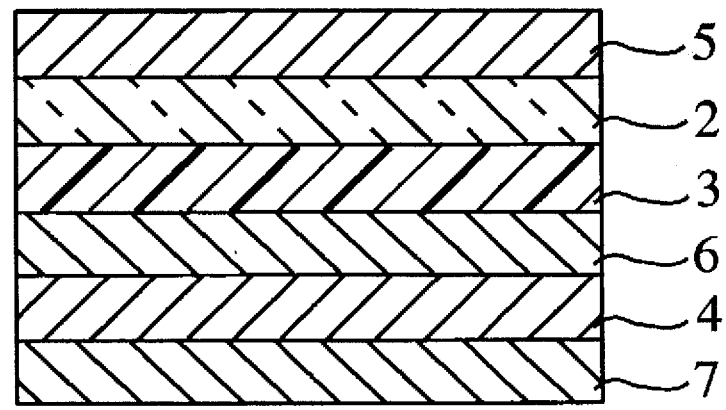
FIG. 2 is a sectional view of another embodiment of the transparency-making recording sheet according to the present invention.
Figure 3A:
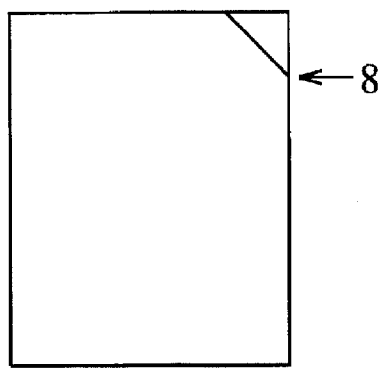
FIGS. 3A to 3F illustrate several embodiments of the inventive transparency-making recording sheet provided with half-cuts.
Figure 3B:
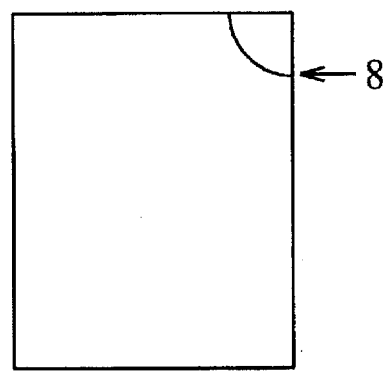
Figure 3C:
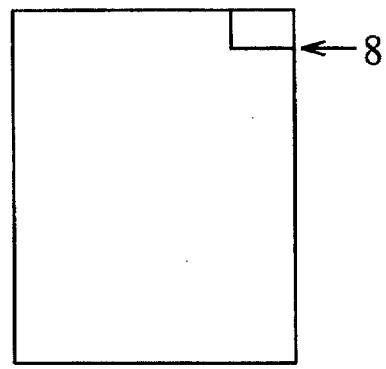
Figure 3D:
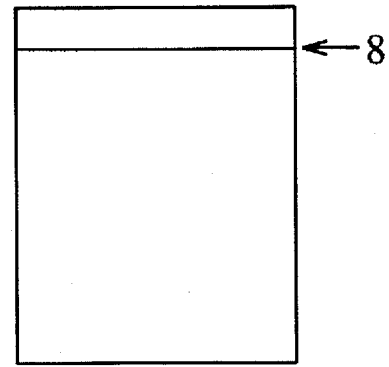
Figure 3E:
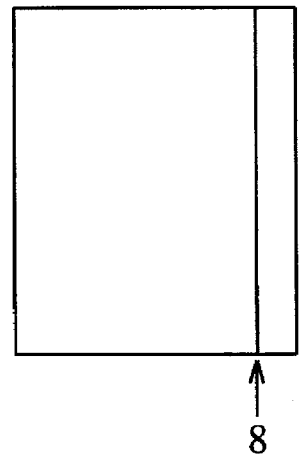
Figure 3F:
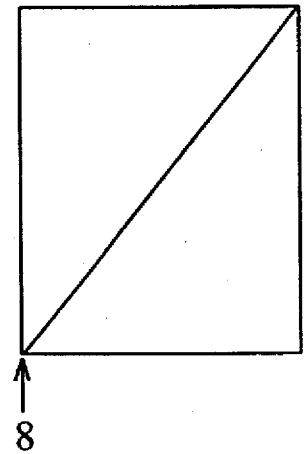

FIG. 1 illustrates one embodiment of the transparency-making recording sheet of the present invention, and FIG. 2 illustrates one embodiment of the transparency-making recording sheet used in the sublimation transfer mode. As can be seen from FIG. 1, the transparency-making recording sheet of the present invention, shown generally at 1, includes a transparent substrate 2 having a recorded major surface and a support sheet 4 releasably provided on the opposed major surface of the substrate 2, between which a thermoplastic resin layer 3 is interleaved by an extrusion coating technique.

If required or as shown in FIG. 2, a receiving layer 5 may be provided on the recorded surface of the transparent substrate 2, an anchor coat layer 6 may be disposed between the support sheet 4 and the thermoplastic resin layer 3 provided by the extrusion coating technique, and a slip layer 7 may be formed on the back surface side of the support sheet 4.

Reference will now be made to each layer or member.

(1) Transparent Substrate

Materials used for the transparent substrate are not critical, provided that they are transparent enough to be used with OHP devices. In view of transparency, dimensional stability and rigidity, however, it is preferable that the transparent substrate is a film formed of thermoplastic resins, for instance, polyester resin, polycarbonate resin, acrylic resin, polyvinyl chloride resin, polypropylene resin, polystyrene resin, polyvinyl alcohol resin, polyethylene resin, diacetate resin, triacetate resin, and polyimide resin, among which a polyethylene terephthalate film is most preferable because it is resistant to heat and unlikely to wrinkle up or curl up due to thermal shrinkage.

The above substrate has preferably a thickness of about 25 to 250 µm, especially 50 to 180 µm.

(2) Receiving Layer

The receiving layer is not always required. In some cases, however, information cannot be directly recorded on the transparent substrate or the image, if somehow recorded thereon, is of considerably poor quality, although depending on recording modes such as ink jet recording, electrophotography, thermal transfer recording, and sublimation transfer recording. In these cases, the receiving layer is formed on the recording surface of the transparent substrate for recording information thereon. This receiving layer, too, must be transparent enough to be used with OHP devices.

The recording modes for which a receiving layer is needed, for instance, are a sublimation transfer mode. This receiving layer for the sublimation transfer mode is provided to receive a dye migrating from a thermal transfer sheet upon heated and maintain the thus formed image.

The binder resin capable of forming the receiving layer for the sublimation transfer mode is exemplified by polyolefin resin such as polypropylene, halogenated vinyl resin such as polyvinyl chloride or polyvinylidene chloride, vinyl resin such as polyvinyl acetate or polyacrylate ester, polyester resin such as polyethylene terephthalate or polybutylene terephthalate, polystyrene resin, polyamide resin, copolymer resin such as one of olefin such as ethylene or propylene with other vinyl monomer, ionomer, cellulose resin such as cellulose diacetate, and polycarbonate, among which the vinyl and polyester resins are most preferable.

The above receiving layer may be of either mono- or multi-layer structure.

It is also preferable to use a cured resin layer as the receiving layer, because surface roughness can be avoided during printing. This cured resin layer may be obtained by the reaction of at least one resin, which is selected from the above resins and which is modified or added thereto with a reactive group capable of reacting with a curing agent, for instance, a hydroxyl, carboxylic acid or amino group, and a curing agent such as a polyisocyanate, polymethylol, epoxy or chelate compound. Alternatively, the curing agents may be allowed to react with each other for the same purpose. This cured receiving layer has an additional merit that even when it contains additives such as ultraviolet absorbers and antistatic agents, it is not adversely affected by those additives, because the receiving layer has been partly cured.

Furthermore in this case, the curing agent-containing receiving layer is provided thereon with a receiving layer containing no curing agent. Although every receiving layer-forming resin may be used in every combination, it is required that the receiving layer containing no curing agent be coated in an amount of up to 1.5 g/m², particularly up to 1.0 g/m². When this receiving layer is coated in an amount exceeding 1.5 g/m², it is then impossible to prevent the surface roughening of the receiving layer at an area printed with high density.

For a receiving layer designed for thermal transfer modes other than the sublimation transfer mode, use may be made of ethylene-vinyl acetate resin, polyamide resin, vinyl chloride-acetate resin, polyester resin, polyurethane resin, polyacrylic ester resin, styrene acrylate resin, polyacrylamide resin, etc. These resins may have been mixed with waxes of animal, plant, petroleum and other sources.

For a receiving layer composition designed for electrophotography, use may be made of polyolefin resin such as polypropylene, polyvinyl chloride resin, polystyrene resin, vinyl acetate resin, halogenated polymer resin such as polyvinylidene chloride, acrylstyrene resin, polyvinyl acetate resin, polyamide resin, vinyl polymer resin such as polyacrylic ester, polyester resin such as polyethylene terephthalate or polybutylene terephthalate, etc., among which the vinyl and polyester resins are most preferable.

For a receiving layer composition designed for ink jet recording, use may be made of water-soluble high molecular compounds such as polyvinyl alcohol, gelatin, styrenebutadiene latex, polyethylene-imine, polyvinyl pyrrolidone, polyacrylamide, styrene-vinyl pyrrolidone copolymers, cellulose derivatives, styrene-maleic anhydride copolymers, polyvinyl acetal, vinyl pyrrolidone-vinyl acetate copolymers, polyglutamic acid, chitin, chitosan, starch, and polyethylene oxide. These compounds may be used in the form of copolymers or mixtures, or may have been modified with cations, etc.

Each receiving layer may be formed of a coating Solution obtained by dissolving the above resin(s) along with additives such as release agents, antioxidants and UV absorbers in a suitable organic solvent or dispersing them in an organic solvent or water. The coating solution is then coated and dried on the transparent substrate by suitable means inclusive of gravure printing, screen printing, reverse roll coating using a gravure plate, or die coating. Alternatively, the above resin(s) and additives may be hot blended together in the absence of an organic solvent or water, and the blend may then be subjected to extrusion coating.

The thus formed dye-receiving layer may have any desired thickness, but it may generally have a thickness of 1 to 50 µm, particularly 1 to 10 µm.

(3) Interlayer (not shown)

A transparent interlayer may be interleaved between the transparent substrate and the receiving layer to achieve improved cushioning properties during printing and increase the adhesion between the substrate and the receiving layer. This interlayer may be formed of resins such as chlorinated polypropylene, modified polyolefin, polyester, and urethane resin.

(4) Thermoplastic Resin Layer

According to the present invention, the transparent substrate and support sheet are laminated together without recourse to a conventional idea underlain by the use of a self-adhesive or adhesive. To be more specific, a thermoplastic resin originally free from adhesion is melted at 240° C. to 340° C. and the melt in a layer form is then provided between the transparent substrate film and the support sheet, whereby they are releasably laminated together.

Thus, the thermoplastic resin layer is provided to laminate the transparent substrate and support sheet together in a releasable manner, and is formed of a thermoplastic resin that shows neither compatibility nor adhesion with respect to the selected transparent substrate and can be processed by extrusion coating.

For this thermoplastic resin, for instance, ethylenevinyl acetate copolymer resin, ethylene-ethyl acrylate copolymer resin, ethylene-acrylic acid copolymer resin, ionomer resin, polyester resin and polyolefin resin may be used. Among these resins but not by way of limitation, polyolefin resins exemplified by low-density polyethylene, medium-density polyethylene, high-density polyethylene, linear low-density polyethylene, polypropylene (homopolymer) and polypropylene (copolymer) are preferably used in view of productivity and cost, and they may be alone or in admixture.

Referring here to the polyolefin resin as an example, this resin has a limited surface energy and shows no adhesion to the above transparent substrate such as a polyethylene terephthalate film. Upon extrusion-coating at a coating temperature of 240° C. to 340° C., the resin is allowed to develop "tack" by heat, which in turn enables the resin to be releasably bonded to the transparent substrate such as a polyethylene terephthalate film.

Upon formation, the thermoplastic resin layer may have a thickness of 10 to 40 μm, but its preferable thickness ranges from 15 μm to 30μm. At less than 15 mm the layer becomes poor in processing stability, whereas at more than 30 μm the layer varies in thickness.

(5) Support Sheet

The support sheet, whether it is transparent or not, may be formed of cellulose fiber paper, synthetic paper, foamed film, white film, synthetic resin film having fine asperities on the surface, and the like.

For the cellulose fiber paper, for instance, use may be made of wood free paper, coat paper, art paper and cast coat paper as well as converted paper with synthetic resin or rubber impregnated or added thereto and converted paper obtained by the extrusion lamination of polyethylene, etc.

For the synthetic paper, foamed film and white film, polyvinyl chloride, polyester, polystyrene, polyethylene, polypropylene, and polyolefin may be used alone or in a composite film form, which have been made finely porous or whitened by known techniques such as decomposition of foaming agents, solvent volatilization, gas incorporation, chemical reactions, elution, sintering, coating, and extrusion foaming. However, the present invention is not limited to the above examples.

For instance, such synthetic paper, foamed film and white film may be obtained by mixing a thermoplastic resin such as polyester resin with inorganic fine particles such as those of calcium carbonate, titanium oxide or barium sulfate, and extruding and stretching the mixture to form therein fine pores the nuclei of which are defined by the inorganic fine particles, or mixing a main component or a thermoplastic resin with incompatible organic fine particles or a polymer, and extruding and stretching the mixture to form therein fine pores.

Moreover, the above synthetic paper, foamed film and white film, when used in the present invention, may be coated on their surfaces with a filler/binder mixture. By use of such a mixture it is possible not only to regulate their brightness, gloss and whitening power but also to impart adhesiveness to them.

The synthetic resin sheet having fine asperities on at least one surface (outer surface) may be obtained by extruding and stretching a synthetic resin alone or a mixture of a synthetic resin with a filler such as talc, clay, silica, calcium carbonate or titanium oxide, transferring the matted surface of a cooling roll on paper such as wood free paper or coat paper with the use of the laminated paper obtained as described just above, or sandblasting or embossing the surface of paper to form fine asperities thereon. Such fine asperities scatter light to impart whitening power to the synthetic paper, and gives slip properties to the synthetic paper as well. The synthetic resin usable to this end is not critical but, in view of cost, processability and physical properties (self-slip properties), particular preference is given to polypropylene and polyethylene resins.

The releasing of the support sheet from the transparent substrate may be achieved either by releasing the thermoplastic resin layer from the transparent substrate or releasing the thermoplastic resin layer from the support sheet.

When the thermoplastic resin layer is released from the transparent substrate, only the transparent substrate after released is used as an OHP sheet.

The thermoplastic resin layer may be released from the transparent substrate in the following manners.

(i) The surface of the support sheet, on which the thermoplastic resin layer is to be provided, is treated by corona discharge, ozone or other treatment so that it can have adhesion. This treatment enables the adhesion between the support sheet and the polyolefin resin to be increased or makes it unlikely for the support sheet to peel off the thermoplastic resin layer.

(ii) The surface of the support sheet, on which the thermoplastic resin layer is to be provided, is anchor-coated with a polyethylene-imine, titanate, urethane or modified polyolefin primer. This anchor coating enables the adhesion between the support sheet and the thermoplastic resin layer to be increased or makes it unlikely for the support sheet to peel off the thermoplastic resin layer.

(iii) For the support sheet, a material that is hardly peeled off the thermoplastic resin layer is used. Paper, etc., may be used as the material that is hardly peeled off the thermoplastic resin layer. When paper is laminated on the thermoplastic resin layer provided by the extrusion coating technique, the paper is infiltrated with the thermoplastic resin layer so that the releasing of the thermoplastic resin layer from the support sheet is made difficult.

The sole or combined use of the above manners enables the transparent substrate to be released from the support sheet.

When the thermoplastic resin layer is released from the support sheet, the laminate of the transparent substrate and thermoplastic resin layer is used as an OHP sheet.

The thermoplastic resin layer may be released from the support sheet in the following manners:

(i) The surface of the transparent substrate, on which the thermoplastic resin layer is to be provided, is treated by corona discharge, ozone or other treatment so that it can have adhesion. This treatment enables the adhesion between the transparent substrate and the thermoplastic resin layer to be increased or makes it unlikely for the transparent substrate to peel off the thermoplastic resin layer.

(ii) The surface of the transparent substrate, on which the thermoplastic resin layer is to be provided, is anchor-coated with a polyethylene-imine, titanate, urethane or modified polyolefin primer. This anchor coating enables the adhesion between the transparent substrate and the thermoplastic resin layer to be increased or makes it unlikely for the transparent substrate to peel off the thermoplastic resin layer.

The sole or combined use of the above manners enables the thermoplastic resin layer to be released from the support sheet.

The peel strength with which the transparent substrate can be peeled off the support sheet depends on the laminating temperature at which the laminating operation has been carried out. This laminating temperature generally lies in the range of 240° C. to 340° C. although it varies with the type of the selected thermoplastic resin. For instance, a laminating temperature of 270° C. to 340° C. is preferable for the polyolefin resin. At less than 270° C. the adhesion between the transparent substrate and the support sheet becomes insufficient, so making the peel strength too low. A laminating temperature higher than 340° C. is not desired, because the adhesion between the transparent substrate and the support sheet becomes more increased than required, or the resin may be thermally decomposed or may become hard to process, although depending on the type.

In the case of the polyethylene resin, the peel strength with which the transparent substrate can be peeled off the support sheet depends on the degree of surface oxidization of the thermoplastic resin during lamination. The higher the degree of surface oxidization, the more the adhesive force of the thermoplastic resin layer. This degree of surface oxidization is dependent on the temperature of the thermoplastic resin at which it is processed; that is, the higher the processing temperature, he higher the degree of surface oxidization. Thus, a preferable processing temperature lies in the range of 270° C. to 340° C. At less than 270° C. the adhesive force of the thermoplastic resin becomes low, whereas at higher than 340° C. the film physical properties of the resin layer comprising the thermoplastic resin become worse.

Moreover, the peel strength with which the transparent substrate can be peeled off the support sheet is affected by the type of the thermoplastic resin. It appears that the lower the melting point of the thermoplastic resin, the better the close contact of the resin with the transparent substrate during lamination and so the higher the peel strength. For instance, the peel strength is low-density polyethylene>medium-density polyethylene>high-density polyethylene>polypropylene which may be provided in the described order to form a resin layer.

Either the laminate of the thermoplastic resin layer and support sheet or the transparent substrate, or either the laminate of the transparent substrate and thermoplastic resin layer or the support sheet may be provided with a half-cut to facilitate release operations.

Examples of such a half-cut are shown in FIGS. 3A to 3F. In the example shown in FIG. 3F, the support sheet or the laminate of the thermoplastic resin layer and support sheet is cut.

(6) Slip Layer

If required, the slip layer may be provided on the back surface of the support sheet so as to improve the ability of the sheet to be mechanically fed, and prevent defects such as curling. This slip layer may be formed of resins such as acrylic resin, cellulose resin, polycarbonate resin, polyvinyl acetal resin, polyvinyl alcohol resin, polyamide resin, polystyrene resin, polyester resin, and halogenated polymer resin, which contain as additives an organic filler such as an acrylic, nylon, Teflon or polyethylene wax filler and an inorganic filler such as silicon dioxide or a metal oxide.

When the support sheet is paper, the above slip layer may be formed by impregnating and coating the paper with an emulsion such as a polyethylene wax or polypropylene wax emulsion.

Also, the back surface of the substrate sheet or the surface of the slip layer may be provided with a detection mark, etc.

The present invention will now be explained at great length with reference to some examples and comparative examples.

EXAMPLE 1

A polyethylene terephthalate film of 75 μm in thickness (T-60 made by Toray Industries, Inc.) was used as the transparent substrate, which was coated on the surface with an interlayer coating solution of the following composition at a basis weight of 3 g/m² as measured upon drying. After drying, the same surface was coated with a receiving layer coating solution at a basis weight of 5 g/m² as measured upon drying, and then dried at 130° C. for 2 minutes to form a receiving layer.

| Receiving Layer Coating Solution | |
| --- | --- |
| Polyester resin (Vyron 600 made by Toyobo Co., Ltd.) | 4.0 parts by weight |
| Vinyl chloride-vinyl acetate copolymer (#1000A made by Denki Kagaku Kogyo K.K.) | 6.0 parts by weight |
| Amino-modified silicone (X-22-3050C made by The Shin-Etsu Chemical Co., Ltd.) | 0.2 parts by weight |
| Epoxy-modified silicone (X-22-3000E made by The Shin-Etsu Chemical Co., Ltd.) | 0.2 parts by weight |
| Toluene/MEK | 89.6 parts by weight |
| Interlayer Coating Solution | |
| Polyester polyol (Adcoat made by Toyo Morton Co., Ltd.) | 15.0 parts by weight |
| Toluene/MEK | 85.0 parts by weight |

Then, a resin layer comprising polyolefin resins was formed on the surface of the substrate opposite to the surface including the transparent receiving layer by extrusion coating at a coating temperature of 320° C. and a thickness of 20 μm of high-density/low-density polyethylenes (having a density of 0.938 g/cm³), and wood free paper was laminated on the resin layer to obtain a color transparency-making recording sheet according to the present invention. While the above color transparency-making recording sheet was put on a commercially available sublimation type of thermal transfer sheet, it was heated from the back surface of the thermal transfer sheet through a thermal head (at an output of 1 W/dot, a pulse width of 0.3 to 0.45 m/sec., and a dot density of 3 dots/mm) to form a dye image on the receiving layer of the color transparency-making recording sheet. Afterwards, the transparent substrate was released from the high-density/low-density polyethylene layer, and the transparent substrate with the image formed on it was projected through an OHP device. It was consequently found that a sharply defined image can be viewed.

EXAMPLE 2

Experimentation was done following Example 1 with the exception that the thickness of the high-density/low-density polyethylene layer was changed to 30 μm.

EXAMPLE 3

Experimentation was done following Example 1 with the exception that the coating temprature of the high-density/low-density polyethylene layer was changed to 300° C.

EXAMPLE 4

Experimentation was done following Example 1 with the exception that low-density polyethylene (having a density of 0.923 g/cm³) was used as the polyolefin resin.

EXAMPLE 5

Experimentation was done following Example 1 with the exception that polypropylene (having a density of 0.91 g/cm³) was used as the polyolefin resin and the coating was carried out at 280° C.

EXAMPLE 6

Experimentation was done following Example 1 with the exception that a slip layer coating solution having the following composition was coated on the surface of the support sheet opposite to the surface including the resin layer comprising the polyolefin resin at a basis weight of 1 g/m² as measured upon drying.

Slip Layer Coating Solution

Polyethylene dispersion (Chemipearl W900 made by Mitsui Petrochemical Industries, Ltd.).

EXAMPLE 7

Experimentation was done following Example 1 with the exception that polyolefin coat paper matted on one surface was used as the support sheet and the other surface (that was not matted) thereof was laminated on the resin layer comprising the polyolefin resin.

EXAMPLE 8

Experimentation was done following Example 1 with the exception that synthetic paper of 60 µm in thickness (Yupo made by Oji Yuka Goseishi K.K.) was used for the support sheet.

EXAMPLE 9

Experimentation was done following Example 1 with the exception that a white polyethylene terephthalate film of 75 µm in thickness (made by Toray industries, Inc.) was used for the support sheet and an anchor coat layer of the following composition was interleaved between the support sheet and the resin layer comprising a polyolefin resin).

Anchor Coat Coating Solution

Urethane primer (T-120 made by Nippon Soda Co., Ltd.).

EXAMPLE 10

Experimentation was done following Example 9 with exception that the surface of the support sheet opposite to the surface including the resin layer comprising the polyolefin resin was coated with a slip layer coating solution of the following composition at a basis weight of 3 g/m².

| Slip Layer Coating Solution | |
|---|---|
| Quaternary copolymer of 1,3-butadiene/ dimethylaminoethyl methacrylate/ethylene glycol dimethacrylate (at a molar ratio of 30:65:5) | 10.0 parts by weight |
| Teflon filler (Lubron L5 made by Daikin Kogyo Co., Ltd.) | 0.1 part by weight |
| Ethanol | 89.9 parts by weight |

EXAMPLE 11

Experimentation was done following Example 1 with the exception that the following composition was used for the receiving layer of the transparency-making recording sheet, thereby obtaining a transparency-making recording sheet for an electrophotographic copy machine. It is here to be noted that the receiving layer coating solution was coated at a basis weight of 3 g/m² as measured upon drying.

| Receiving Layer Coating Solution | |
|---|---|
| Polyester resin (Vyron 290 made by Toyobo Co., Ltd.) | 60.0 parts by weight |
| Antistatic Agent (TB-34 made by Matsumoto | 0.04 parts by weight |

| Receiving Layer Coating Solution (continued) | |
|---|---|
| Yushi K.K.) | |
| Inorganic fine particles (Cyloid 162 made by Fuji Devinson Chemical Co., Ltd.) | 0.4 parts by weight |
| Toluene/MEK (= 1/1) | 240.0 parts by weight |

COMPARATIVE EXAMPLE 1

Experimentation was done following Example 1 with the exception that the resin layer comprising a polyolefin resin was changed to the following self-adhesive layer, the support sheet to white PET (of 38 µm in thickness), and the primer layer of the support sheet to the following composition.

| Self-Adhesive Layer (of 3.0 g/m² as measured upon drying) | |
|---|---|
| Self-adhesive (acrylic emulsion) (Esdine AE-349 made by Sekisui Esdine Co., Ltd.) | 15.0 parts by weight |
| Water | 60.0 parts by weight |
| Primer Layer (of 0.5 g/m² as measured upon drying) | |
| DP Urethane primer (made by Showa Ink Co., Ltd.) | 20.0 parts by weight |
| Coronate 2030 (Nippon Polyurethane Co., Ltd.) | 0.34 parts by weight |
| Toluene/MEK (= 1/1) | 80.0 parts by weight |

The peeling resistance with which, in each of the obtained transparency-making recording sheets, the transparent substrate could be peeled off the support sheet, was estimated on five-grade basis with a grade five for the comparative example 1 wherein the support sheet was laminated on the substrate through a self-adhesive as usual. The results are shown in TABLE 1.

Estimation Grade for Feeling Resistance
1: slightly low resistance
2: slightly low yet suitable resistance
3: suitable resistance
4: slightly high resistance
5: high resistance and peeling made noise

TABLE 1

| | Thermoplastic Resin Layer | | Thickness (µm) | Peeling Resistance |
|---|---|---|---|---|
| | Type | Coating Temp. (°C.) | | |
| Ex. | | | | |
| 1 | HD/LDPE | 320 | 20 | 3 |
| 2 | HD/LDPE | 320 | 30 | 3 |
| 3 | HD/LDPE | 300 | 20 | 3 |
| 4 | LDPE | 320 | 20 | 4 |
| 5 | PP | 280 | 20 | 2 |
| 6 | HD/LDPE | 320 | 20 | 3 |
| 7 | HD/LDPE | 320 | 20 | 3 |
| 8 | HD/LDPE | 300 | 20 | 3 |
| 9 | HD/LDPE | 320 | 20 | 3 |
| 10 | HD/LDPE | 320 | 20 | 3 |
| 11 | HD/LDPE | 320 | 20 | 3 |
| Comp. Ex. 1 | Self-adhesive | — | — | 5 |

In the comparative example, an amount of air was contained in the self-adhesive layer upon formation, and so the resultant transparency-making recording sheet was made irregular on the surface by air bubbles. Moreover, a part of the self-adhesive layer was transferred to the transparent substrate.

As compared with the conventional sheet using a self-adhesive layer, the present invention can provide a transparency-making recording sheet having many advantages, including:

(1) excellent processability is achieved at high speed, (2) stable production is well achieved, (3) there is no variation of peel strength, (4) peel strength can be controlled by selection of processing conditions, and (5) excellent surface stability is achieved.

Thus, it is possible to provide at low costs a thermal transfer receiving layer good enough for making color transparencies.

What is claimed is:

1. A transparency-making recording sheet comprising:

a transparent substrate;

a support sheet releasably provided on a non-recording surface of the transparent substrate; and a thermoplastic resin layer interposed between the transparent substrate and the support sheet, the thermoplastic resin being formed by an extrusion coating.

2. The transparency-making recording sheet according to claim 1, wherein said thermoplastic resin layer comprises a polyolefin resin.

3. The transparency-making recording sheet according to claim 2, wherein either one of said transparent substrate and support sheet is provided with a half-cut.

4. The transparency-making recording sheet according to claim 1, wherein said transparent substrate is releasable from said thermoplastic resin layer.

5. The transparency-making recording sheet according to claim 4, wherein either one of said transparent substrate and support sheet is provided with a half-cut.

6. The transparency-making recording sheet according to claim 1, wherein either one of said transparent substrate and support sheet is provided with a half-cut.

7. The transparency-making recording sheet according to claim 1, wherein the recording sheet is used for sublimation transfer recording.

8. The transparency-making recording sheet according to claim 7, further comprising a receiving layer comprising a dyeable resin, the receiving layer formed on the transparent substrate.

9. The transparency-making recording sheet according to claim 1, wherein said thermoplastic resin layer is a release layer.

10. The transparency-making recording sheet according to claim 1, wherein said support sheet is releasable directly from said thermoplastic resin layer.

11. The transparency-making recording sheet according to claim 1, wherein said transparent substrate is releasable directly from said thermoplastic layer.

12. A method for producing transparencies, comprising the steps of:

providing a transparent substrate;

extrusion coating the surface of the transparent substrate with a thermoplastic resin to form a thermoplastic resin layer; and superposing a releasable support on the surface of the thus extrusion coated thermoplastic resin to obtain a transparency.

13. The method for producing transparencies, according to claim 12, wherein the thermoplastic resin comprises a polyolefin resin.

* * * * *